Patented Dec. 11, 1928.

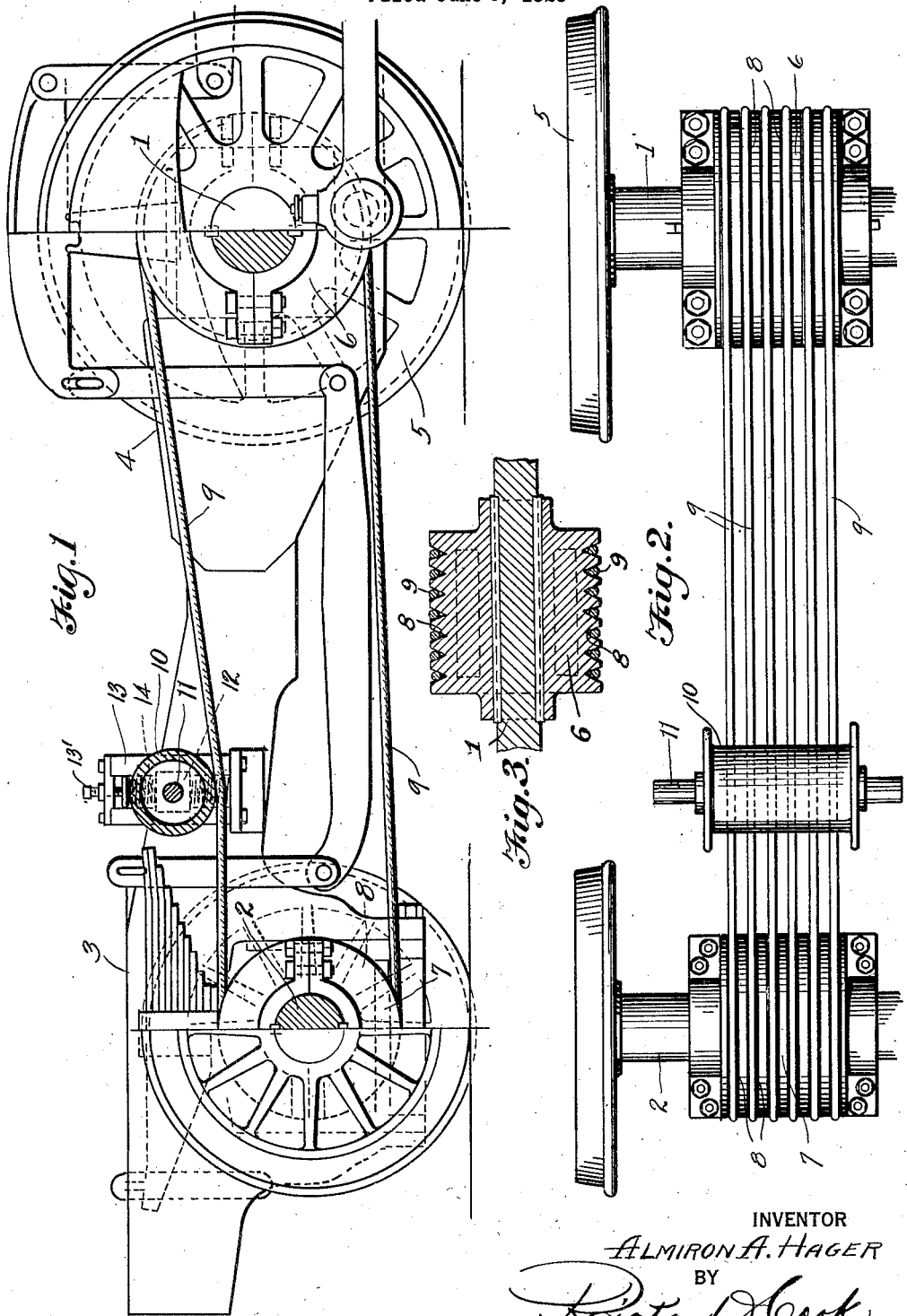

1,694,652

UNITED STATES PATENT OFFICE.

ALMIRON A. HAGER, OF WELLINGTON, WASHINGTON.

LOCOMOTIVE GOVERNOR.

Application filed June 3, 1925. Serial No. 34,577.

This invention relates to improvements in locomotives and more particularly to what may be termed a governor that is applicable to those types of locomotives now generally in use for hauling freight and passenger trains and which are driven by the application of power to one or more sets of drivers; the object of the invention being to provide means for preventing slipping and spinning of the drivers under all ordinary conditions.

Explanatory to the invention, it will be stated here that the power of a locomotive of the usual type to do work is dependent on the energy it can exert to produce motion without the driving wheels slipping and is dependent on the adhesive power of the locomotive. This power is proportional to the weight on the driving wheels. It is now common practice to increase the adhesion of the wheels to the rails by the application of sand. Railway engineers and trainmen are generally of the opinion that it is impossible to prevent the driving wheels of a locomotive from slipping under certain operating conditions and, as locomotives are now constructed and operated, it may be stated that this opinion is substantially correct. To those familiar with this undesirable feature of train operation, the damage that may be caused incidental to slipping and spinning of the drivers is well known. It causes draw bars to be pulled out, serious delays, heavy damage to rails and tires, reduces tractive power and rate of travel to the extent on grades of an engine failure.

In view of the above statements, it has been the object of this invention to overcome all of these undesirable results by the provision of means for preventing slippage of the drivers under all ordinary conditions which now cause this result. More particularly, the invention resides in the provision of means whereby the frictional coherence or adhesiveness to the rails of wheels other than the drivers but on which considerable weight is placed is used to supplement that of the drivers to such extent that the latter at all times will maintain their entire amount of tractive energy and will not slip.

Specifically stated, the invention resides in the provision of a positive governing connection, by means of cables or equivalent devices, between the axles of a pair of drivers and a pair of engine or trailer truck wheels through which the tractive energy available in the wheels of said trucks is added to that of the drivers.

In carrying out the present invention, I have taken advantage of the fact that most all locomotives of that character requiring a device of the present character are equipped with engine pony or trailer trucks that do not serve in the driving mechanism but simply as supporting means for carrying that weight of the locomotive not carried by the drivers. In most instances each pair of wheels in the engine truck, or those of the trailer, carry approximately as much and sometimes more weight than any pair of drivers, and, since they are of lesser diameter, than the drivers, they have more adhesiveness to the rails. The gist of the invention resides in connecting the axle of one of the pairs of drivers with an axle of one pair of wheels of the engine or trailer truck by a plurality of cables extended about sheaves fixed to these axles so that through this connection the adhesiveness of the wheels of the connected auxiliary load carrying trucks is utilized to supplement that of the drivers at all times.

In accomplishing the objects of the invention, I have provided the improved details of construction, the preferred forms of which are illustrated in the accompanying drawings, wherein—

Figure 1 shows in side elevation and partly in sectional view, certain parts of a railway locomotive to which the parts embodied by the present invention are applied.

Figure 2 is a plan view illustrating the application of the sheave wheels to the axles of the drivers and trailer trucks and the disposition of the connecting cables about the sheaves.

Figure 3 is a sectional view of the sheave as mounted on an axle.

Referring more in detail to the several views of the drawings, wherein like reference numerals designate like parts—

1 designates what may be the connecting axle of the rear pair of driving wheels of a railway locomotive and 2 designates the connecting axle of a pair of trailer truck wheels which, at its ends, is mounted in suitable bearings provided in a trailer frame, designated at 3, and which is pivotally connected, toward its forward end, to the main frame structure designated at 4.

It will be stated here that the particular details of construction of the frame structures and other parts of the locomotive to which the present governor device is to be attached, is immaterial so long as such construction and arrangement of parts does not interfere with the installation of the device on the locomotive. It will also be stated that the particular design shown in the drawing is only for the purpose of illustration and it is not to be understood that the present device can be applied only to engines of this type. It is intended that, where it is not feasible because of the structural arrangement of parts of an engine, to utilize the wheels of a trailer truck, that the rear set of wheels of the forward engine truck be connected with the axle of the forward pair of drivers, or, if this is not feasible, to connect the axle of the rear set of drivers with the forward axle of the tender. It is further apparent that one or more of these specified connections could be used on the same locomotive if this is desired.

Fixed to the axle 1 centrally between the drivers, designated at 5, is a sheave wheel 6 and likewise fixed on the axle 2 in alinement with sheave wheel 6 is a sheave wheel 7, both of which are provided with a like number of circumferential, V-shaped grooves 8 in which continuous cables 9 operate and which are drawn taut about the sheave by a smooth surfaced idler sheave 10 mounted on the trailer frame to bear yieldably and downwardly against the upper runs of the cables.

It is preferred that the supporting axle 11 of the sheave 10 be mounted at its ends in bearings 12 that are slidably contained in guide frames 13 fixed on frame 3 or 4 and in which coiled springs 14 are located to urge the bearings downwardly so that in this way the idler is pressed against the cables and the latter held taut so that they will not slip on the sheaves. The tension may be adjusted by set screws 13' mounted in the top of frame 13.

The sheave wheels, in their preferred form of construction, would be divided longitudinally to provide two complemental sections applicable to opposite sides of the axles and to be held functionally together by bolts extended through their hub portions. Each section would also be equipped with a key slot and each half would be keyed to its axle so that the strain would be equalized between the two sections. This method of sheave construction affords convenience in construction as well as providing for easy and inexpensive installation on the axle.

While it is apparent that any desirably constructed cable could be used to connect the sheaves, it is intended to use fibre clad, wire, transmission rope composed of a plurality of strands of crucible cast steel wire each of which is served with the best grade of tarred, Russian hemp marline which not only is for the purpose of protecting the wires from moisture, rust and foreign matter, such as coal, dust, ashes, etc., but also gives the rope a very high co-efficient of friction, and at the same time will not ice up in freezing weather, swell in damp weather or shrink in hot weather.

In order that the cable connection between the two sheaves may operate without causing any slippage of the cable on the sheaves, and so that the wheels of the trailer and drivers may at all times maintain the same lineal speed, the sheaves are so made that their diameters bear the same proportional relation to each other as do the diameters of the wheels with which they are associated. The grooves would be located in the sheaves in as close relation as practicable for cable of a certain specified thickness or diameter. To secure the best results the cable should have a diameter of about one-thirtieth of the diameter of the sheaves.

Assuming that a locomotive is equipped with a governor device of this character, it is readily apparent that should there be a tendency at any time for the drivers to slip on the rails, the percentage of adhesiveness of the drivers to the rails that is lost, is instantly supplied from the truck wheels through the cable connections and this tendency to slip is overcome.

It is further apparent that the connecting cables will run smoothly without strain and will only take the strain when the adhesiveness of the drivers to the rails is impaired. Due to their flexibility they will stay in the grooves regardless of lateral play of the trailer frame during travel about curves.

It is also apparent that various changes in the details of construction and combination of parts could be made without departing from the spirit of the invention and for this reason I do not wish to be confined only to the details herein shown.

Having thus described my invention, what I claim as new therein and desire to secure by Letters-Patent, is:

In a railway locomotive, the combination with the axle of a pair of drivers and the axle of a pair of wheels of a trailer, engine or tender truck, of sheave wheels fixed on said axles in operative alinement; each being provided with a plurality of circumferential V-shaped grooves, cable belts operating about said sheaves in said grooves and an idler sheave mounted to bear yieldably against said cable belts to retain them taut and against slippage on the sheaves; the diameters of said sheave wheels bearing the same proportional relation to each other as the diameters of said drivers and truck wheels bear to each other.

Signed at Wellington, King County, Washington, this 26th day of March, 1925.

ALMIRON A. HAGER.